(12) United States Patent
She et al.

(10) Patent No.: US 9,380,658 B2
(45) Date of Patent: Jun. 28, 2016

(54) DEVICE FOR CONTROLLING A STORAGE DEVICE

(71) Applicant: KONINKLIJKE PHILIPS N.V., Eindhoven (NL)

(72) Inventors: Hongjun She, Suzhou (CN); Yanmeng Sun, Shangha (CN); Tracy Li Cheng, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/365,133

(22) PCT Filed: Dec. 11, 2012

(86) PCT No.: PCT/IB2012/057160
§ 371 (c)(1),
(2) Date: Jun. 13, 2014

(87) PCT Pub. No.: WO2013/088333
PCT Pub. Date: Jun. 20, 2013

(65) Prior Publication Data
US 2015/0305101 A1 Oct. 22, 2015

(30) Foreign Application Priority Data
Dec. 13, 2011 (WO) ................ PCT/CN2011/083895

(51) Int. Cl.
*H05B 37/00* (2006.01)
*H05B 33/08* (2006.01)
*H02M 3/155* (2006.01)

(52) U.S. Cl.
CPC ........... *H05B 33/0815* (2013.01); *H02M 3/155* (2013.01); *H05B 33/0824* (2013.01); *Y02B 20/383* (2013.01)

(58) Field of Classification Search
CPC .................. H05B 33/0815; H05B 33/0824
USPC ................. 315/291, 294, 297, 302, 307, 309; 363/13, 41
See application file for complete search history.

(56) References Cited

U.S. PATENT DOCUMENTS

| | | | |
|---|---|---|---|
| 6,762,652 B2 | 7/2004 | De Groot | |
| 7,550,934 B1 | 6/2009 | Deng et al. | |
| 8,076,867 B2 * | 12/2011 | Kuo | H05B 33/0818 315/291 |
| 8,111,017 B2 * | 2/2012 | Lin | H05B 37/0263 315/209 R |
| 8,629,629 B2 * | 1/2014 | Hariharan | H05B 33/0815 315/225 |
| 8,963,535 B1 * | 2/2015 | Melanson | G01R 33/07 307/116 |
| 2002/0112942 A1 | 8/2002 | Galmiche et al. | |
| 2005/0213353 A1 | 9/2005 | Lys | |
| 2008/0224636 A1 * | 9/2008 | Melanson | H05B 33/0815 315/307 |
| 2009/0160422 A1 | 6/2009 | Isobe et al. | |
| 2010/0277072 A1 * | 11/2010 | Draper | H05B 37/0218 315/149 |
| 2011/0193495 A1 * | 8/2011 | Mishima | H02M 3/1588 315/307 |

(Continued)

FOREIGN PATENT DOCUMENTS

| | | |
|---|---|---|
| CN | 1428922 A | 7/2003 |
| CN | 201541361 U | 8/2010 |

(Continued)

*Primary Examiner* — Jason M Crawford

(57) ABSTRACT

A device for controlling the amount of energy stored in a storage device comprises a control unit that is adapted to adjust the power received via an input of the device, based on the amount of energy currently stored in the storage device, and that is further adapted to output the adjusted power via an output of the device to the storage device.

11 Claims, 3 Drawing Sheets

(56) References Cited

U.S. PATENT DOCUMENTS

2012/0019714 A1* 1/2012 Hiramatu ........... H05B 33/0815
                                                    348/370
2012/0106216 A1   5/2012 Tzinker et al.

FOREIGN PATENT DOCUMENTS

| CN | 102098843 A | 6/2011 |
| WO | 2011033415 A1 | 3/2011 |

* cited by examiner

DEVICE FOR CONTROLLING A STORAGE
DEVICE

CROSS-REFERENCE TO PRIOR APPLICATIONS

This application is the U.S. National Phase application under 35 U.S.C. §371 of International Application No. PCT/IB2012/057160, filed on Dec. 11, 2012, which claims the benefit of [e.g., U.S. Provisional Patent Application No. or European Patent Application No.] CN2011/083895, filed on Dec. 13, 2011. These applications are hereby incorporated by reference herein.

FIELD OF THE INVENTION

The invention relates to a device, a method and a system for controlling a storage device, and in particular to a device for controlling the amount of energy stored in a storage device.

Currently, there is an increasing demand for lamps that are smaller, provide better beam control and exhibit reduced energy consumption compared to ordinary incandescent lamps. The demand for energy saving lamps is based on economic reasons, since the reduced energy consumption reduces operational costs.

Multifaceted reflector (MR) lamps are at present commonly used in lighting applications. MR lamps, and in particular MR16 lamps, are regularly used instead of standard incandescent light bulbs e.g. for applications that require directional lighting, such as recessed ceiling lights, desk lamps, landscape lighting etc. MR16 lamps generally use halogen light sources and generally operate at low voltages, and therefore require an electronic transformer to convert the 120 or 230 V main line voltage to the low operating voltage of the lamp.

MR16 halogen lamps produce significant heat and care must be taken to avoid direct contact with skin or flammable materials when the lamp is on or has been on recently. For this reason MR16 compatible LED lamps have become widely used recently. They are similar in shape to MR16 halogen lamps and can be used in most fixtures designed for MR16 lamps. Due to the low heat generation and low power consumption, they can be manufactured from plastic, thereby reducing manufacturing costs.

However, fixtures designed for MR16 halogen lamps that use electronic transformers need to be retrofitted with LED compatible transformers. One reason for this is that standard electronic transformers require a minimum operating power, whereas LED lamps can operate at a lower operating power.

Further, even if the minimum power requirement is fulfilled, flicker can occur. This is ascribable to the fact that conventional electronic transformers use simple buck circuits with an electrolytic capacitor, as a result of which a current flowing through a LED can be interrupted, thereby causing flicker that can be observed by the human eye.

Accordingly, there is a need for a lamp driver that has the capability to dynamically adapt to different electronic transformer outputs as well as to different electronic transformers, in order to solve the compatibility issues described above.

Although preferred embodiments of the present invention are described with reference to lighting applications, the present invention is not limited thereto and can be used in a variety of different applications where compatibility issues between a power supply and a storage device and/or a load that is associated with the storage device arise.

SUMMARY OF THE INVENTION

In view of the above-mentioned drawbacks and problems associated with the prior art, it is an object of the present invention to provide a device, a system and a method for controlling a storage device by means of which the compatibility problems associated with the prior art can be solved. It is another object of the present invention to avoid a stroboscopic effect or flicker occurring in lighting applications.

These objects are achieved by the features of the independent claims.

The present invention is based on the idea to adjust the energy supply to a storage device, based on the amount of energy already stored in the storage device, so that the storage device does not become empty and/or the energy level in the storage device is maintained at a predetermined level.

The term "adjusting power" preferably refers to the adjustment of a current and/or a voltage.

The object is achieved by a device for controlling the amount of energy stored in a storage device. The device preferably comprises a control unit that is adapted to adjust the power received via an input of the device, based on the amount of energy currently stored in the storage device, and that is further adapted to output the adjusted power via an output of the device to the storage device.

By adjusting the energy supply to the storage device, the control unit prevents the storage device from becoming empty. Preferably, the control unit maintains the energy level constant, within a predetermined range or above a lowest level, so that e.g. when the storage device functions as a power supply for a LED lamp no observable flicker occurs. Accordingly, the device may function as an interface between a power supply and a storage device, thereby establishing compatibility between said power supply and said storage device (and a load connected to the storage device). This is in particular advantageous in cases where a given kind of storage device (e.g. included in lamp drivers) and/or load (e.g. LED) have to be operated in combination with different power supplies (e.g. electronic transformers).

Preferably, the control unit is adapted to receive a voltage signal (Vin), which indicates the amount of energy currently stored in the storage device. The control unit may directly sense/measure said voltage signal permanently, periodically or aperiodically. Alternatively, the control unit may automatically receive the voltage signal periodically or aperiodically from the storage device or a device associated with the storage device, such as a monitoring unit of the storage device. As a further alternative, the control unit may actively request the voltage signal from the storage device or the monitoring unit. The voltage signal may be a voltage that is applied to the storage device. For instance, when the storage device is a capacitor, the voltage signal may be a voltage of the capacitor. Accordingly, the control unit can easily derive, from the voltage signal, an amount of energy stored at present in the storage device. If the voltage signal is received from the monitoring unit, it may be a digital signal of high and low logic voltage levels.

Preferably, the control unit comprises a micro controller unit (MCU) and a converter circuit being adapted to adjust the received power. The MCU may be a single integrated circuit containing a processor core and a memory and at least one of an analog/digital converter, a comparator, timer/counter means and programmable input/output means. The MCU may be adapted to control and monitor an operation of the device. Preferably, the MCU is further adapted to control and/or monitor the storage device and/or the power supply. The analog/digital converter may be adapted to convert the received analog voltage signal indicating the amount of energy into a digital signal before further processing.

The converter circuit may be an amplifier circuit. In particular, the converter circuit may include a boost converter having a switching device, for instance a MOSFET.

Preferably, the converter circuit is adapted to adjust the received power, based on control signals received from the MCU. The MCU may periodically or aperiodically provide the control signals to the converter circuit, so that sufficient energy is drawn into the storage device. The control signals may be generated based on the measured/determined amount of energy stored in the storage device, but may also be based on at least one further condition such as the reception of external remote control signals, available power, characteristics of the storage device (e.g. maximum storage capacity etc.), the kind of load connected to the storage device, etc. Preferably, the control signals are generated based on the received voltage signal (Vin).

Preferably, the control signals from the MCU comprise a first control signal for controlling a duty cycle of a switching device included in the converter circuit. The switching device may include a metal oxide semiconductor field-effect transistor (MOSFET), an insulated-gate bipolar transistor (IGBT) or a bipolar junction transistor (BJT).

Preferably, the control signals from the MCU comprise a second control signal for controlling a maximum (or peak) current of the converter circuit. The MCU may use one of the first and the second control signal or both control signals to adjust the received power. Using both control signals has advantages with respect to an increased accuracy of the adjustment.

Preferably, the first and/or second control signals are pulse width modulation (PWM) signals. The PWM signals may be high-frequency PWM signals.

Thus, in a preferred embodiment, a current going through the switching device (e.g. a MOSFET) may be controlled in two ways: turn-on time of the switching device and peak current of the converter circuit within the turn-on time of the switching device. The turn-on time may be controlled by the first control (PWM) signal, and the peak current may be controlled by the second control (PWM) signal. There may be a current sensing circuit connected to the switching device for sensing a current flowing through the switching device. When the peak current reaches a set value, the switching device will be turned off even though the first PWM duty cycle is still in turn-on time. This has the following advantages. An output voltage from power supplies (e.g. electronic transformers) may vary (e.g. depending on an AC input voltage of the electronic transformer) and thus, different electronic transformers have different output voltages. Hence, the current going through the switching device also varies. Thus, according to the present invention, the device preferably adjusts the duty cycle of the switching device and the peak current, in order to achieve compatibility.

Preferably, the power is further adjusted based on at least one of a received remote control signal and a temperature value. The temperature value may be sensed by external and/or internal temperature sensors. Accordingly, if e.g. a temperature above a certain limit is detected, the control unit may decide to stop adjusting and/or stop outputting power to the storage device in order to prevent damage to the device and/or the storage device and/or further devices associated therewith.

For controlling the amount of energy stored in the storage device and in particular for controlling the converter circuit and/or the output of the converter circuit, the control unit may use P, PI or PID control (regulation). Preferably, PID (proportional-integral-derivative) control is applied. An error associated with P, PI or PID control may be defined as a difference between an amount of energy currently stored in the storage device (derived from the voltage signal) and a predetermined value. The control unit may select P, I and D parameters, depending on certain conditions, such as temperature, kind of the applied storage device, amount of energy currently stored in the storage device, kind of power supply, etc. However, the control unit may also apply a fixed set of predetermined PID parameters. The control unit may further perform a routine to determine a proper set of PID parameters when the converter circuit is initially connected to a power supply. This further increases the ability of the device to adapt to a variety of different power supplies.

Preferably, the device is included in a driver circuit of a light source or is operatively coupled to a driver circuit of a light source. In the latter case, the device may be a stand-alone device. By applying the device to lighting applications, different light sources can be used in combination with different electronic transformers included e.g. in fixtures. Thus, for instance conventional halogen lamps can be replaced by energy-saving LED lamps without the necessity to also replace the electronic transformers included in a fixture designed for halogen lamps. Hence, by applying the device, a driver circuit of a light source can cooperate with a plurality of different electronic transformers. In other words, a lighting device comprising a light source and the driver circuit as above mentioned for driving the light source is provided. Preferably, the light source of the lighting device comprises at least one light emitting diode (LED) or a string of LEDs.

In another aspect of the present invention, a system for controlling an amount of energy stored in a storage device is provided. The system preferably includes a device as described above that is connected to a power supply, a storage device and at least one load connected at least to the storage device.

Preferably, the power supply includes an electronic transformer and/or a rectifier.

Preferably, the storage device includes at least one capacitor. In particular, the storage device may include an intermediate electrolytic capacitor.

Preferably, the at least one load includes at least one buck converter and/or at least one light source. The load may include a light source that comprises at least one light emitting diode (LED), a plurality of LEDs and/or a string of LEDS. The buck converter may be designed according to the requirements of the at least one LED, and may in particular include two switches (e.g. a transistor and a diode), an inductance and a capacitor.

In another aspect of the present invention, a method of controlling an amount of energy stored in a storage device is provided. The method preferably comprises the steps of sensing the amount of energy currently stored in a storage device, and adjusting the power to be supplied to the storage device, based on the sensed amount of energy. The method may employ the device as described above, and may further be applied to a system which has also been described above.

Preferably, the step of adjusting the power includes at least one of adjusting a duty cycle of a switching device of a converter circuit, adjusting a maximum or peak current value of the converter circuit, and stopping the adjusting of power and/or stopping the outputting of adjusted power when the sensed amount of energy is not within a predetermined range. Referring to the latter, by stopping the outputting of the adjusted power to the storage device, damage to the storage device can be prevented.

BRIEF DESCRIPTION PF THE DRAWINGS

DETAILED DESCRIPTION

Although preferred embodiments of the present invention are described with reference to lighting applications, the present invention is not limited thereto and can be used in a variety of different applications where compatibility issues between a power supply and a storage device and/or a load arise.

Figure 1:
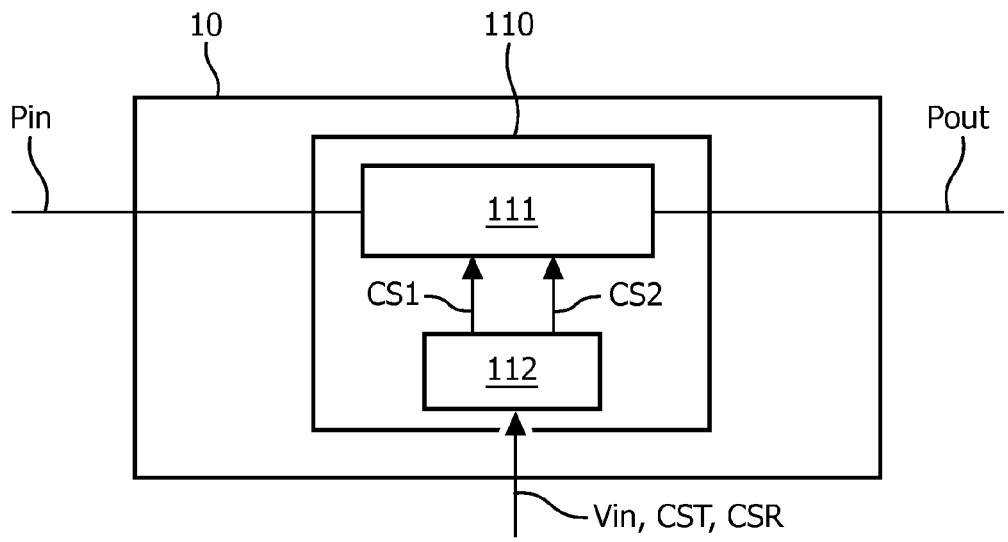
FIG. 1 shows a device according to an embodiment of the present invention.

FIG. 1 shows a device 10 according to an embodiment of the present invention. The device 10 includes a control unit 110 and is adapted to receive power Pin from a power supply via an input, and to output power Pout via an output. The input and the output may each include plugs, sockets, pressure connections and/or a combination thereof.

The control unit 110 comprises a converter circuit 111 and a MCU 112. The power Pin received via the input is supplied to the converter circuit 111. The converter circuit 111 adjusts the received power Pin, based on control signals CS1, CS2 from the MCU 112. Preferably, the converter circuit 111 is an amplifier circuit, in particular a boost converter. The boost converter may include an inductance, a diode and a switching device, wherein the switching device is preferably a MOSFET and the diode is preferably a Schottky diode.

The MCU 112 receives external signals Vin, CST and CSR. The voltage signal Vin indicates the amount of energy currently stored in the storage device that is connected or operatively coupled to the output of the device 10. CST may indicate a temperature value received from and measured by external and/or internal temperature sensors. CSR may be a control signal received from a remote control and/or inputted by a user. In case of lighting applications, CSR may indicate a dimming level requested by a user. The MCU 112 generates at least one of the control signals CS1 and/or CS2, based on the voltage signal Vin. The control signals CS1 and CS2 may further be based on at least one of the received signals CST and CSR and on further conditions such as kind of power supply, kind of storage device, capacity of the storage device, etc.

The control signals CS1 and CS2 may be used to adjust operation conditions of the converter circuit 111. For instance, CS1 may result in a variation of a duty cycle of a switching device included in the converter circuit. Preferably, the control signal CS1 is a pulse width modulation (PWM) signal. Further, CS2 may be used to vary a maximum or peak current of the converter circuit 111. Preferably, CS2 is a PWM signal, too.

Thus, a current going through the switching device (e.g. a MOSFET) may be controlled in two ways: turn-on time of the switching device and a peak current of the converter circuit 111 within the turn-on time of the switching device. The turn-on time of the switching device may be controlled by the first control (PWM) signal CS1, and the peak current of the converter circuit 111 may be controlled by the second control (PWM) signal CS2. Further, there may be a current sensing circuit provided that is connected to the switching device and that senses a current flowing through the switching device. When the peak current reaches a set value, the switching device may be turned off even though the first PWM duty cycle is still in turn-on time. Hence, both control signals CS1, CS2 control an on/off state of the switching device.

Preferably, the control unit 110 adjusts the received power such that a predetermined energy level in the storage device 30 is maintained. The predetermined energy level may be preset in the MCU 112, or may be automatically determined by the MCU 112 when the device 10 is initially connected to the power supply and/or the storage device. The predetermined energy level is preferably a level above which a normal operation of a load connected to the storage device, e.g. a LED, is ensured. Additionally or alternatively, the MCU 112 may determine and/or set the predetermined energy level periodically or aperiodically. Thus, the device can dynamically adapt to changes in a load connected to the storage device. This is advantageous in cases where the load changes during operation, for instance due to heating of the load (e.g. in case of a light source).

For adjusting the received power Pin, the MCU 112 preferably uses PID control. This is in particular advantageous when an energy level of the storage device has to be kept (approximately) constant. An error used for PID control may be defined as a difference between an amount of energy being currently stored in the storage device (derived from the voltage signal Vin) and a predetermined value. The MCU 112 may select P, I and D parameters, depending on certain conditions, such as temperature (e.g. detected via CST described above), kind of storage device, amount of energy currently stored in the storage device, kind of power supply, etc. Preferably, the MCU 112 uses a fixed set of (predetermined) PID parameters stored in an internal memory of the MCU 112. The MCU 112 may further perform a routine to determine a proper set of PID parameters when the device 10 is initially connected to the power supply. This further increases the ability of the device 10 to adapt to a variety of different power supplies.

Figure 2:
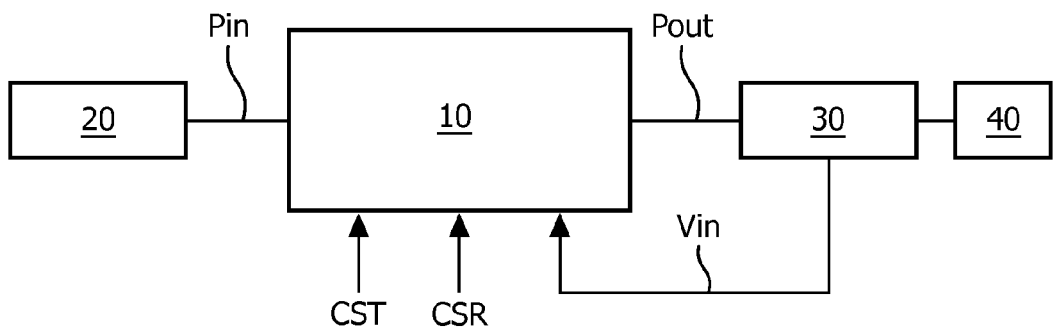
FIG. 2 shows a system including the device of FIG. 1.

FIG. 2 shows a system including a device 10 as described above. The device 10 is connected to a power supply 20 and to a storage device 30. The storage device 30 is connected to a load 40. In case of a lighting application, the load 40 may comprise at least one buck converter and at least one light source. The device 10 receives the voltage signal Vin from the storage device 30 that indicates the amount of energy currently stored therein. The load 40 receives power from the storage device 30, i.e. the power for operating the load 40 is provided by the storage device 30. For instance, if the load 40 comprises an LED, the storage device 30 provides constant current to the LED.

Figure 3:
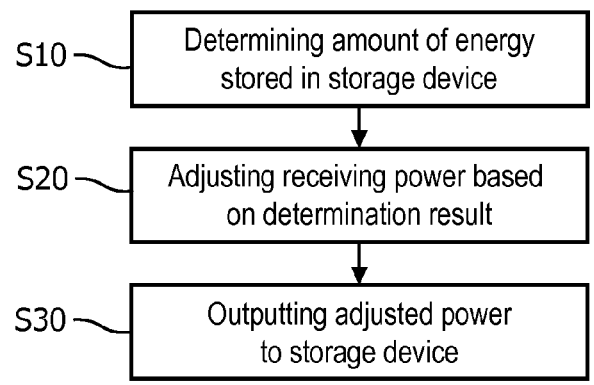
FIG. 3 shows a flow diagram of a method according to a first embodiment of the present invention.

FIG. 3 shows a flow diagram of a method according to a first embodiment of the present invention. In step S10 the device 10 determines or senses the amount of energy stored in the storage device 30. The device 10 may sense a voltage signal Vin and derive the amount of energy from the magnitude of said voltage signal Vin. For deriving said amount, the device 10 may further use parameters such as a kind of storage device 30 or parameters associated with the storage device 30. For instance, when the storage device 30 is a capacitor, the device 10 may use a capacitance value thereof and the voltage signal Vin to derive the amount of stored energy.

In step S20 the device 10 adjusts the power Pin received from the power supply 20 via an input of the device 10, based on the determined amount of energy. Additionally, the adjustment may be further based on a sensed/received temperature value CST and/or a remote control CSR signal from a user. The device 10 may adjust the received power Pin such that a predetermined energy level is maintained in the storage device 30. In this aspect the device 10 may use PID control as described above. Alternatively, the device 10 may adjust the received power Pin, based on a lower threshold of the stored energy amount. For instance, if the stored energy amount is determined to be below the lower threshold, the device 10 may adjust the received power Pin such that more energy is supplied to the storage device 30.

When the storage device 30 is a capacitor, the device 10 may adjust the duty cycle of a switching device 113 included in the converter circuit 111 in such a manner that the capacitor is recharged faster. Thus, when the load is a LED, flicker due to an the capacitor getting empty can be effectively prevented. Additionally or alternatively, the device 10 may adjust a peak current of the converter circuit 111.

In step S30 the device 10 outputs the adjusted power to the storage device 30.

Figure 4:
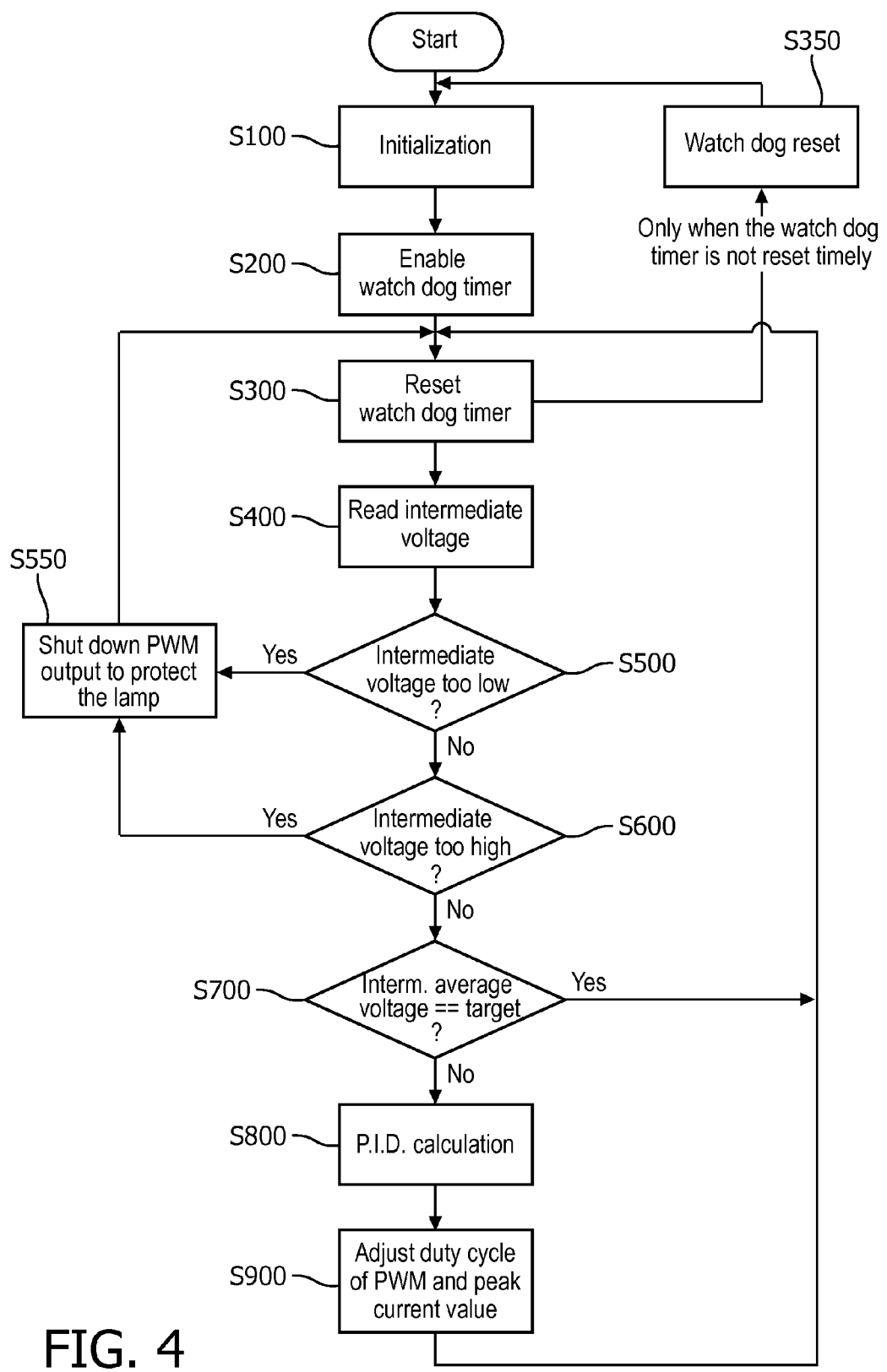
FIG. 4 shows a flow diagram of a method according to a second embodiment of the present invention.

FIG. 4 shows a flow diagram of a method according to a second embodiment of the present invention. The method employs a system shown in FIG. 2.

In step 100 the system is initialized. In step 200 a watch dog timer is enabled. The watch dog is a feature that is integrated in the MCU 112 and that functions independently. A program running on the MCU 112 (e.g. a program for adjusting the received power) has to reset the watch dog timer within preset time intervals. When the watch dog timer is not reset within the preset time interval, the watch dog resets the MCU 112 in step S350 at least partially, i.e. the watch dog preferably stops and restarts the running program that has failed to reset the watch dog timer. This might happen when the program fails to run normally, for example, halts. When the program runs abnormally, the watch dog cannot be reset in time and will be activated to restart the program. This is a prevention method to solve "flying" or "halting" program problems.

If the watch dog timer has been reset in time (step 300), the method proceeds to step S400. In step 400 the MCU 112 processes a voltage signal Vin indicating the amount of energy currently stored in the storage device. The MCU 112 may analog-to-digital convert said voltage signal Vin for further processing. The further processing may include deriving an amount of energy stored in the storage device and compare the derived amount with a predetermined value. However, the MCU 112 may also compare the digitized voltage signal with a predetermined value, without the deriving step. When the voltage signal/amount is not within a predetermined range, i.e. below a lower threshold value (step 500) or above an upper threshold value (step 600), the device 10 stops, in step 550, outputting the control signals CS1, CS2 and/or shuts down the converter circuit 111 in order to prevent damage to the storage device 30 and/or the load 40 connected to the storage device 30.

In step S700, when the voltage signal/amount is within the predetermined range and, moreover, is equal or approximately equal to a target value, the device 10 performs no adjustment of the received power Pin and the method restarts from step S300. Otherwise, when the voltage signal/amount is within the predetermined range, yet deviates from a target value, the device 10 performs, in step S800, a PID calculation based on the voltage signal/amount. Finally, in step S900, the device 10 adjusts the received power Pin using PID calculation and the method proceeds to step S300.

Figure 5:
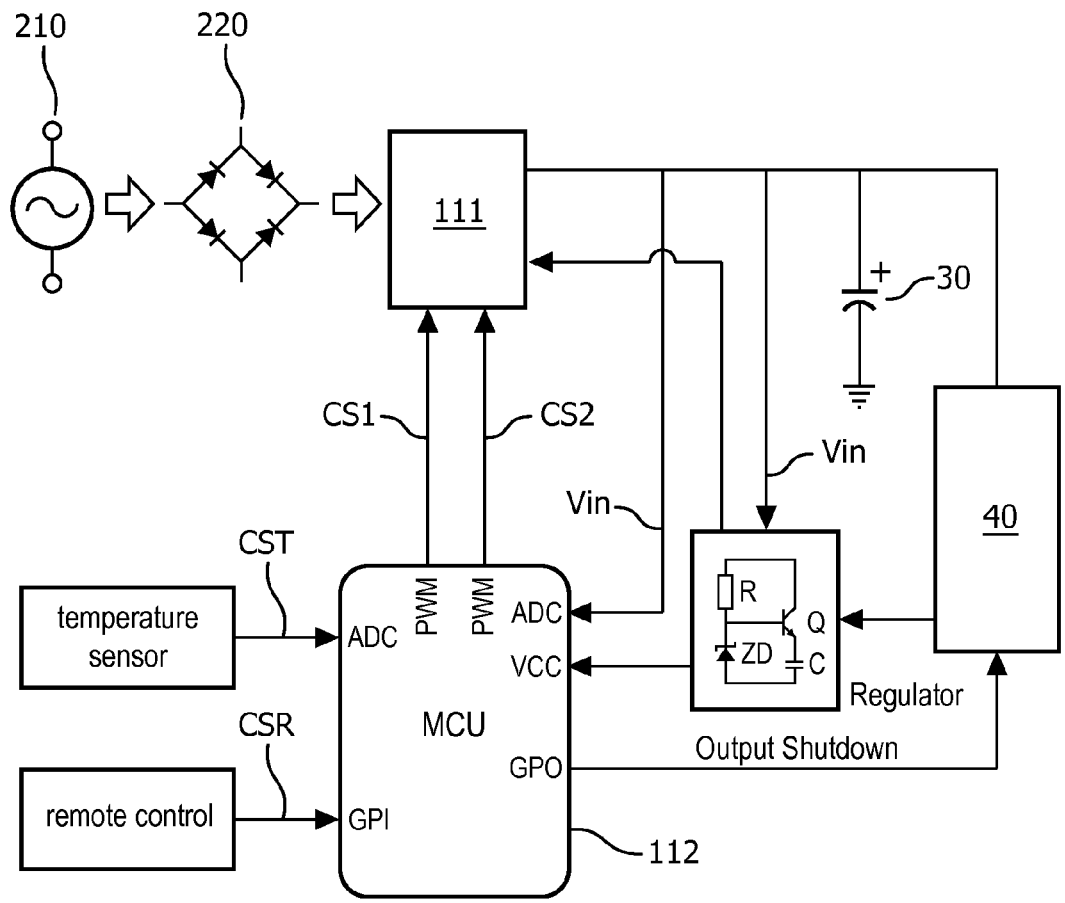
FIG. 5 shows an application employing the device of the present invention.

FIG. 5 shows a detailed system, for instance a lighting system, employing the device 10 of the present invention.

AC Power from a power source 210 is rectified by rectifier 220 and then supplied to the converter circuit 111 of the device 10. The power source 210 and the rectifier 220 may be regarded as the power supply 20 of FIG. 2. The device 10 including the converter circuit 111 and the MCU 112 may perform the functions described above. The MCU 112 may be further adapted to control and/or monitor the load 40 or elements thereof (e.g. a buck converter included in the load 40). The converter circuit 111 is connected to the storage device 30, which is for instance a capacitor. In this example, a first (positive) capacitor electrode is connected to the converter circuit 111 and to the load 40, respectively. A second capacitor electrode is connected to ground. The capacitor 30 receives power, i.e. a current, from the converter circuit 111 and stores said power. In this embodiment, the capacitor 30 provides a constant current to the load 40. The load 40 may include at least one buck circuit and at least one LED. The buck circuit may convert a first voltage provided by the converter circuit 111 into a second voltage that is suitable for the at least one LED. Further, a regulator may be provided. The regulator may be a VCC regulator known in the art and may be adapted to receive signals from the load 40 and the voltage signal Vin. Further, the regulator may be adapted to output signals to a VCC input of the MCU 112 and to the converter circuit 111.

The MCU 112 receives a voltage signal Vin indicating the amount of energy currently stored in the storage device 30. The MCU 112 may further receive a signal CST from internal and/or external temperature sensors and a signal CSR from a remote control. The MCU 112 outputs control signals CS1 and CS2 to the converter circuit 111 at least based on Vin. For instance, if the converter circuit 111 is a boost converter, the MCU 112 may output the first control signal CS1 that causes a variation of a duty cycle of the switching device of the converter circuit 111, which switching device is preferably a MOSFET. The first control signal CS1 may be used to optimize a duty cycle of the switching device, depending on the amount of energy stored in the storage device 30 and/or according to the requirements of the load 40. The first control signal CS1 may be a pulse width modulation (PWM) signal.

Alternatively or additionally, the MCU 112 may output the second control signal CS2 that causes a change in the maximum current of the converter circuit 111. For instance, the second control signal CS2 may be a pulse width modulation (PWM) signal that varies a commutation period of the switching device.

Thus, a current going through the switching device may be controlled by adjusting the turn-on time of the switching device and the peak current of the converter circuit 111 within the turn-on time of the switching device. The turn-on time is controlled by the first control signal, and the peak current is controlled by the second control signal. There may be a current sensing circuit included in the device 10 that is connected to the switching device for sensing the current flowing through the switching device. When the peak current reaches a set value, the switching device may be turned off even though the first PWM duty cycle is still in the turn-on time.

The MCU 112 may further be adapted to output a shutdown command to the load 40, for instance if the sensed voltage signal Vin is not within a predetermined range. Accordingly, damage to the load 40 can be prevented.

According to this embodiment, the converter circuit (e.g. a boost converter) can adapt to different electronic transformers and draw sufficient energy into the capacitor 30 for the buck converter included in the load 40. With limited voltage ripple on the capacitor 30 the buck converter may deliver a constant current to the LED or LED string with very small ripple, thereby eliminating flicker and the stroboscopic effect. The MCU 112 is further able to control the buck converter in the case of different requirements, such as different light output at different ambient temperatures or remote control signal input, adjusting the LED luminance for thermal protection, and so on. Since the drawn current is adjusted to an optimal level, a high efficiency and a high power factor can be achieved.

Figure 6:
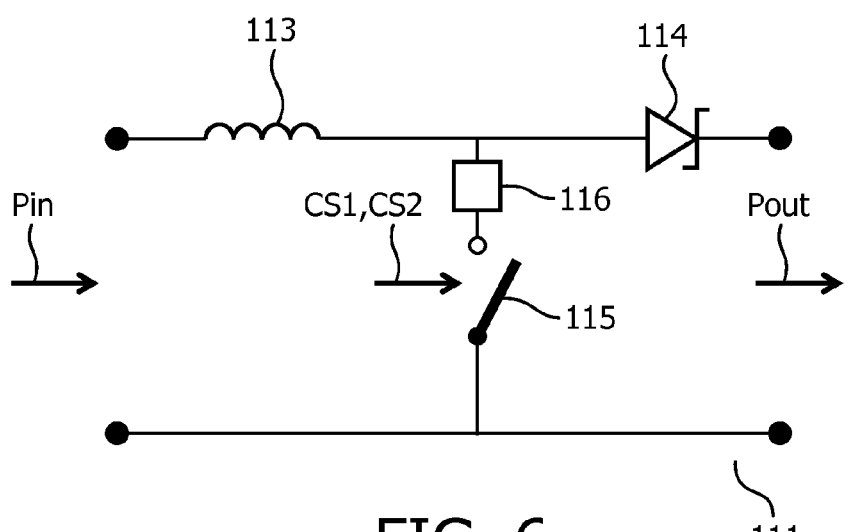
FIG. 6 shows a block diagram of a converter circuit of the device according to the present invention.

FIG. 6 is a block diagram of a converter circuit 111 of the device 10 according to a preferred embodiment of the present invention. The converter circuit 111 includes a boost converter having an inductance 113, a diode 114 and a switching device 115, wherein the latter is preferably a MOSFET. The converter circuit 111 further comprises a current sensing circuit 116 for sensing a current flowing through the switching device 115. The switching device 115 may be a Schottky diode, which provides a high switching rate.

According to the present invention, an energy supply to a storage device is adjusted based on the amount of energy already stored in the storage device, so that the storage device does not become empty and/or the energy level in the storage device is maintained at a predetermined level. Accordingly, the present invention solves compatibility problems between power supplies and loads to be connected to the power supply.

The invention claimed is:

1. A control device for controlling the amount of energy stored in a storage device, comprising:
a control unit, wherein the control unit comprises a microcontroller (MCU), adapted to:
receive a voltage signal (Vin), which indicates the amount of energy currently stored in the storage device;
adjust the power (Pin) received via an input of the control device, based on the amount of energy currently stored in the storage device, wherein the control unit comprises a converter circuit configured to adjust the received power (Pin), and adjusting the power (Pin) including adjusting a maximum current value of the converter circuit based on the amount of energy currently stored in the storage device, wherein:
the converter circuit is configured to adjust the received power (Pin), based on control signals received from the MCU;
the control signals from the MCU comprise a first control signal for controlling a duty cycle of a switching device included in the converter circuit and a second control signal for controlling the maximum current of the converter circuit by varying a communication period of the switching device; and
the MCU is configured to turn off the switching device when the maximum current reaches a predetermined value while the duty cycle of the switching device is and remains in turn-on time; and
output the adjusted power (Pout) via an output of the control device to the storage device.

2. The control device according to claim 1, wherein the MCU is adapted to generate at least one of the control signals, based on the received voltage signal (Vin), which indicates the amount of energy currently stored in the storage device.

3. The control device according to claim 1, wherein the converter circuit is a boost converter.

4. The control device according to claim 1, wherein the control signals are pulse width modulation (PMW) signals.

5. The control device according to claim 1, wherein power is further adjusted based on at least one of:
a received remote control signal; and
a temperature value sensed by an external and/or internal temperature sensor.

6. The control device according to claim 1, wherein the MCU uses PID control for adjusting the received power (PIN).

7. A driver circuit for driving a light source, comprising a control device according to claim 6.

8. A lighting device comprising a light source and the driver circuit according to claim 7 for driving the light source.

9. The lighting device according to claim 8, wherein the light source comprises at least one light emitting diode (LED) or a string of LEDs.

10. A system for controlling the amount of energy stored in a storage device, including:
a control device according to claim 1, said control device being connected to a power supply;
a storage device; and
a load connected at least to the storage device; wherein at least one of the following applies:
the power supply includes an electronic transformer and/or a rectifier;
the storage device includes at least one capacitor;
the storage device includes an intermediate electrolytic capacitor;
the load includes at least one buck converter and/or at least one light source; and
the load includes at least one light source that comprises at least one light emitting diode or a string of LEDs.

11. A method for controlling the amount of energy stored in a storage device comprising the steps of:
sensing amount of energy currently stored in a storage device;
adjusting power to be supplied to the storage device, based on the sensed amount of energy, wherein the step of adjusting the power includes:
adjusting received power (Pin) via an input of a control device, based on control signals received from a microcontroller (MCU), wherein the control signals from the MCU comprise a first control signal for controlling a duty cycle of a switching device included in a converter circuit and a second control signal for controlling the maximum current of the converter circuit by varying a communication period of the switching device; and
turning off the switching device when the maximum current reaches a predetermined value while the duty cycle of the switching device is and remains in turn-on time.

* * * * *